(12) United States Patent
Chan et al.

(10) Patent No.: US 11,668,564 B2
(45) Date of Patent: Jun. 6, 2023

(54) LASER LEVELING TOOL WITH IMPROVED LASER PATTERN PROJECTION

(71) Applicant: Robert Bosch GmbH, Stuttgart (DE)

(72) Inventors: Chi Fung Chan, North Point (HK); Hopong Cheung, North Point (HK); Yuenyu Wong, North Point (HK); Ben-Hur Seneca, North Point (HK)

(73) Assignee: Robert Bosch GmbH, Stuttgart (DE)

( * ) Notice: Subject to any disclaimer, the term of this patent is extended or adjusted under 35 U.S.C. 154(b) by 245 days.

(21) Appl. No.: 17/272,984

(22) PCT Filed: Sep. 12, 2018

(86) PCT No.: PCT/CN2018/105145
§ 371 (c)(1),
(2) Date: Mar. 3, 2021

(87) PCT Pub. No.: WO2020/051784
PCT Pub. Date: Mar. 19, 2020

(65) Prior Publication Data
US 2021/0325184 A1   Oct. 21, 2021

(51) Int. Cl.
*G01C 15/00*   (2006.01)

(52) U.S. Cl.
CPC .................................. *G01C 15/004* (2013.01)

(58) Field of Classification Search
USPC ........................................................ 33/290
See application file for complete search history.

(56) References Cited

U.S. PATENT DOCUMENTS

| 5,689,330 A | 11/1997 | Gerard et al. |
| 6,085,155 A * | 7/2000 | Hayase ................ G01C 15/004 |
| | | 702/40 |
| 6,816,302 B2 * | 11/2004 | Sandstrom .......... G03F 7/70041 |
| | | 359/290 |
| 7,936,445 B2 * | 5/2011 | Hintersteiner .......... G03F 7/706 |
| | | 355/52 |
| 9,193,076 B2 | 11/2015 | Taijeron |

(Continued)

FOREIGN PATENT DOCUMENTS

| CN | 1145471 A | 3/1997 |
| CN | 1164021 A | 11/1997 |

(Continued)

OTHER PUBLICATIONS

International Search Report corresponding to PCT Application No. PCT/CN2018/105145, dated May 31, 2019 (4 pages).

*Primary Examiner* — Christopher W Fulton
(74) *Attorney, Agent, or Firm* — Maginot, Moore & Beck LLP

(57) ABSTRACT

A laser leveling tool comprising: a laser source configured to emit a laser beam; and a digital laser beam projection system which transmits the laser beam emitted from the laser source and converts the laser beam into a projection pattern that is to be projected to a target surface; wherein the digital laser beam projection system comprises a pixel panel arranged to receive the laser beam emitted from the laser source and comprising pixel units which are selectively activated to reflect or transmit the laser beam, the reflected or transmitted laser beam conforming to a desired projection pattern to form a patterned laser beam.

20 Claims, 4 Drawing Sheets

(56) References Cited

U.S. PATENT DOCUMENTS

| | | | | |
|---|---|---|---|---|
| 9,436,071 | B2* | 9/2016 | Kreye | H04N 9/3161 |
| 9,581,966 | B1* | 2/2017 | Georges, III | G03H 1/0443 |
| 11,025,873 | B2* | 6/2021 | Albou | B60Q 1/076 |
| 2019/0082151 | A1* | 3/2019 | Kishimoto | H04N 5/7416 |
| 2022/0191440 | A1* | 6/2022 | Pertierra | G02B 27/46 |

FOREIGN PATENT DOCUMENTS

| | | |
|---|---|---|
| CN | 101644880 A | 2/2010 |
| CN | 201852572 U | 6/2011 |
| CN | 102455583 A | 5/2012 |
| CN | 104364609 A | 2/2015 |
| CN | 107664496 A | 2/2018 |
| CN | 207132897 U | 3/2018 |

* cited by examiner

LASER LEVELING TOOL WITH IMPROVED LASER PATTERN PROJECTION

This application is a 35 U.S.C. § 371 National Stage Application of PCT/CN2018/105145, filed on Sep. 12, 2018 in China, the disclosure of which is incorporated herein by reference in their entirety.

The disclosure relates to a laser leveling tool for creating desired laser patterns on a target surface.

BACKGROUND

Laser leveling tools or levelers are generally used in construction and decoration industries. A conventional laser leveling tool comprises at least one laser beam emitter for emitting a laser beam which is projected onto a target surface to form a predefined pattern serving as a reference for facilitating operation during construction or remodeling.

Traditional laser leveling tools can only project limited patterns, such as a dot, a straight laser line or a cross, onto the target surface. However, sometimes it is desired to project some other patterns, generally more complex patterns, onto the target surface. For example, it may be desired to project a curve line, a circle, a grid, a figure composed of straight and curve lines, etc. so that operators can work on the subject more conveniently. It is now impossible or difficult to do so with traditional laser leveling tools. In addition, traditional laser leveling tools can only output patterns which are previously stored by manufacturers. Users cannot customize the tool outputs in accordance with real application conditions.

Further, patterns projected onto the target surface by traditional laser leveling tools are fixed. That is to say, once the position and orientation of the laser leveling tool is fixed, the pattern projected onto a target surface is also fixed. If the operator wants to change the current pattern, for example, to shift the pattern, the operator has to manipulate the laser leveling tool again, which is inconvenient.

It is thus highly desired to have a laser leveling tool which can output more laser patterns in a more flexible manner.

SUMMARY

An object of the disclosure is to provide a laser leveling tool which is able to generate various laser patterns for facilitating the operation of an operator.

For achieving this object, in one aspect, the disclosure provides a laser leveling tool comprising: a laser source configured to emit a laser beam; and a digital laser beam projection system which transmits the laser beam emitted from the laser source and converts the laser beam into a projection pattern that is to be projected to a target surface; wherein the digital laser beam projection system comprises a pixel panel arranged to receive the laser beam emitted from the laser source and comprising pixel units which are selectively activated to reflect or transmit the laser beam, the reflected or transmitted laser beam conforming to a desired projection pattern to form a patterned laser beam.

According to a possible embodiment, the digital laser beam projection system is an LCOS type projection system in which the pixel panel comprises an LCOS type reflection panel.

According to a possible embodiment, the digital laser beam projection system is a DLP type projection system in which the pixel panel comprises a DMD reflection panel.

According to a possible embodiment, the digital laser beam projection system is an LBS type projection system in which the pixel panel comprises two moving reflective mirrors to generate projection patterns with self-focusing.

According to a possible embodiment, the digital laser beam projection system further comprises a projection lens configured to receive the patterned laser beam and project it in an enlarged scale to a target surface.

According to a possible embodiment, the laser leveling tool further comprises a circuit board which comprises a control unit configured to control the operations of the laser source and the digital laser beam projection system.

According to a possible embodiment, the circuit board further comprises a memory in which projection patterns are stored.

According to a possible embodiment, the laser leveling tool further comprises a user interface via which projection patterns designed by the user can be inputted into the laser leveling tool; the user interface may be either a physical interface on the laser leveling tool or a wireless interface which is in communication with a smart device.

According to a possible embodiment, the laser leveling tool further comprises a screen which is configured to be able to display the projection pattern to which the patterned laser beam conform; the screen may further form a user interface.

According to a possible embodiment, the digital laser beam projection system further comprises beam shaping and expansion optics disposed between the laser source and the pixel panel.

According to a possible embodiment, the pixel panel is a reflection type liquid crystal panel facing to a direction substantively perpendicular to the optical axis of the laser source, and the digital laser beam projection system further comprises a beam splitter disposed in the optical axis of the laser source at a location faced by the pixel panel.

According to a possible embodiment, the pixel panel is a transmission type liquid crystal panel disposed in the optical axis of the laser source facing to a direction substantively parallel to the optical axis of the laser source.

According to a possible embodiment, the reflection or transmission rate of each pixel unit is adjustable by means of the control unit.

According to a possible embodiment, the projection pattern is variable by adjusting the reflection or transmission rate of corresponding pixel units.

According to a possible embodiment, the brightness the whole projected pattern or one or more portions of it can be set or adjusted by adjusting the reflection or transmission rate.

According to a possible embodiment, the projection pattern can be moved or rotated by adjusting the reflection or transmission rate.

According to a possible embodiment, the whole projected pattern or one or more portions of it can be flashed by adjusting the reflection or transmission rate.

According to a possible embodiment, one or some local portions of the projected pattern can be set or adjusted to be different from other ones by adjusting the reflection or transmission rate.

According to a possible embodiment, the projection property of the projection lens is adjustable by means of the control unit.

According to a possible embodiment, the projection angle, enlargement rate, and/or focus depth of the projection lens is adjustable by means of the control unit.

According to a possible embodiment, the laser leveling tool has a focus free projection mode which is achieved by adjusting the focus depth of the projection lens.

According to a possible embodiment, the laser leveling tool further comprises a self-leveling mechanism for setting the laser leveling tool to be in a self-leveled orientation.

According to a possible embodiment, the laser leveling tool further comprises a leveling feedback device for detecting the orientation of the laser leveling tool, and the control unit is able to perform orientation compensation to the projection pattern by rotating it around one or more axes.

According to a possible embodiment, the size and pitch of the pixel units are determined for achieving desired pattern accuracy. In accordance with the disclosure, various laser patterns can be generated by the laser leveling tool, thereby a user can select a laser pattern to be projected according to the real operation condition. Further, the user can perform treatment to the laser patterns before or during operation. For example, the user can input, edit and select a laser pattern before operation and change or modify the current laser pattern during operation. Thus, the laser leveling tool of the disclosure significantly facilitates the operations.

Other advantages and aspects of the disclosure will be described in the detailed description.

BRIEF DESCRIPTION OF THE DRAWINGS

The disclosure will be further understood by reading the following detailed description with reference to the drawings in which.

DETAILED DESCRIPTION

Now a laser leveling tool according to possible embodiments of the disclosure will be described with reference to the drawings.

Figure 1:
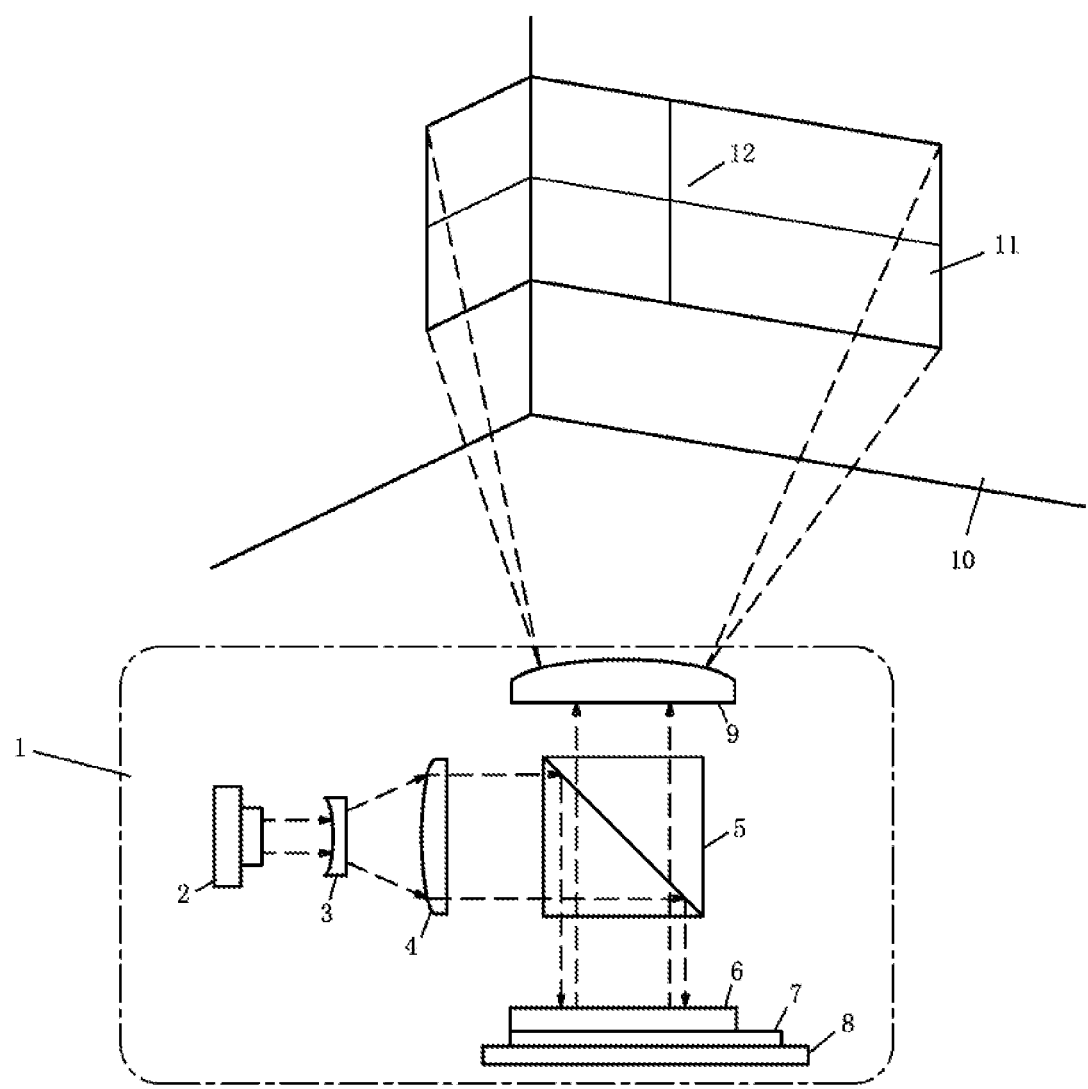
FIG. 1 is a schematic view of a laser leveling tool according to a first embodiment of the disclosure.

As shown in FIG. 1, a laser leveling tool 1 according to a first embodiment of the disclosure comprises a laser source 2 which is able to emit a laser beam. The laser beam may have a predetermined color, for example, red or green as generally used, or other colors or a combination of different colors.

The laser leveling tool 1 further comprises a digital laser beam projection system which transmits the laser beam emitted from the laser source 2 and converts the laser beam into a projection pattern that is to be projected to a target surface. The digital laser beam projection system will be described below.

In a first optical axis defined by the laser beam emitted from the laser source 2, beam shaping and expansion optics are disposed. In FIG. 1, a beam expansion optic 3 and a beam shaping optic 4 are shown as examples of the beam shaping and expansion optics, while other types or configurations of them can used here as alternative or in addition to these illustrated. The beam shaping and expansion optics shape and expand the laser beam emitted from the laser source 2 to output an enlarged laser beam which includes parallel laser lines.

A beam splitter 5 is disposed in the first optical axis facing the enlarged laser beam. The beam splitter 5 is configured to reflect most, nearly all, of the enlarged laser beam in a second optical axis which is substantively perpendicular to the first optical axis. A reflection type pixel panel 6 is disposed in the second optical axis facing the laser beam reflected from the beam splitter 5.

According to a possible embodiment, the digital laser beam projection system is an LCOS (Liquid Crystal on Silicon) type projection system in which the reflection type pixel panel 6 is a reflection type liquid crystal panel formed by LCOS process.

The laser source 2 and the reflection type pixel panel 6 are controlled by a control unit of a circuit board 7. The reflection type pixel panel 6 comprises an array of pixel units exposed to the laser beam reflected form the beam splitter 5. Each pixel unit has a reflection rate that is controlled by the control unit. For example, the reflection rate of the pixel unit is controlled by a voltage applied thereto.

A screen 8 is connected to the circuit board 7 and is exposed to the outside of the laser leveling tool 1 so that it can be seen by a user. The screen 8 may also be configured as a human-machine interface (HMI), for example, a touch screen, so that the user can input common via it.

By selectively activating one or some of the pixel units of the reflection type pixel panel 6, a laser beam, which conforms to a desired pattern in a cross section, is reflected by the reflection type pixel panel 6 in the second optical axis. The desired pattern may be displayed on the screen 8 at the same time.

This patterned laser beam reflected from the reflection type pixel panel 6 is transmitted into the beam splitter 5. The beam splitter 5 is configured to allow most, nearly all, of the laser beam incoming in the second optical axis be transmitted through it.

A projection lens 9 is disposed in the second optical axis facing the laser beam transmitted through the beam splitter 5. The projection lens 9 has an optical axis substantively coinciding with the second optical axis.

The patterned laser beam is expanded by the projection lens 9 and then projected out of the laser leveling tool 1 to be projected onto a target surface 10, for example, a wall. The laser beam projected onto the wall within a defined projection area 11 and creating a projection pattern 12 in the projection area 11. It is appreciated that, although the projection area 11 is shown to be smaller than the target surface 10, it may alternatively be larger than the target surface 10 in one or two dimensions.

The projection lens 9 may be a variable projection lens which is also controlled by the control unit so that the projection property of the projection lens 9, including the projection angle, enlargement rate, focus depth, etc., is adjustable and thus the size and/or the aspect ratio of the projection area 11 is adjustable.

The circuit board 7 comprises a memory in which various projection patterns can be stored. The projection patterns may include those previously designed by the manufacturer of the laser leveling tool 1 and those designed and inputted by the user of the laser leveling tool 1. The user may input commands and designed projection patterns via the HMI of the laser leveling tool 1, such as that integrated to the screen 8 or a separate one, or in a wireless manner, for example, by using a smart device (like a smart phone) which is in communication with the laser leveling tool 1 and has been installed with a corresponding APP.

When using the laser leveling tool 1, the user can select a desired projection pattern to be projected and then instruct the laser leveling tool 1 to project the projection pattern. During operation, if the user wants to change the projection pattern with another one, or wants to modify the projected pattern, the user may input commands to the laser leveling tool 1. The laser leveling tool 1 in turn may modify the size, location, orientation, aspect ratio, focus depth or the like by means of the control unit. In addition, the brightness of the projected pattern can be modified by means of the control unit by varying the reflection rate of corresponding pixel units. The brightness of the projected pattern can be determined according to environment illuminating condition, and, by controlling the brightness of the projected pattern, an eye protection function can be provided.

In addition, the whole projected pattern or one or more portions of it can be flashed within a time period or through the operation.

In addition, one or some local portions of the projected pattern may be set or adjusted to be different from other ones. For example, one or some local portions of the projected pattern may be brighter, larger in scale, thicker, etc., or may be in different colors (if more than one color can be outputted), flashing rates, or forms (for example, presented by different types of lines, shadings, symbols, etc.).

In addition, different patterns, or different portions of a pattern, can be projected alternately.

Figure 2:
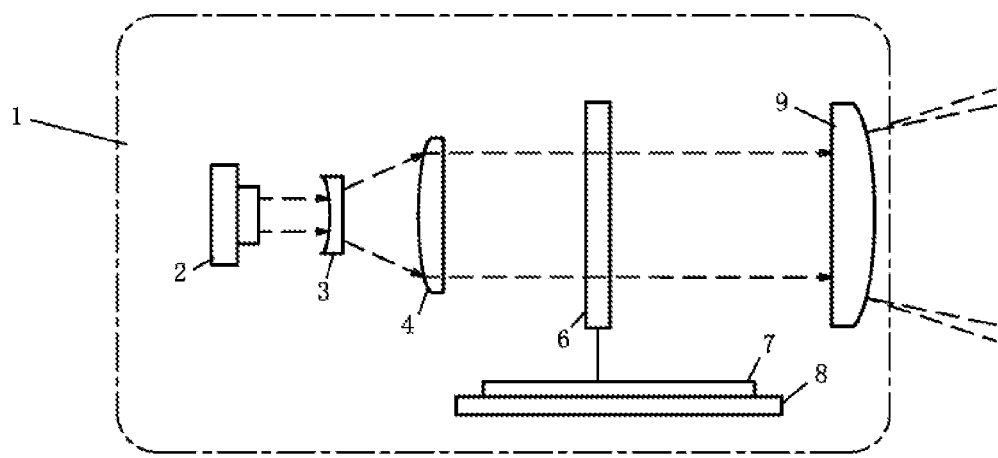
FIG. 2 is a schematic view of a laser leveling tool according to a second embodiment of the disclosure.

FIG. 2 shows a laser leveling tool 1 according to a second embodiment of the disclosure which mainly comprises a laser source 2 defining a first optical axis and configured to emit a laser beam. The laser leveling tool 1 further comprises beam shaping and expansion optics (illustrated as a beam expansion optic 3 and a beam shaping optic 4), a transmission type pixel panel 6 and a projection lens 9 disposed in sequence in the first optical axis facing the laser beam emitted from the laser source 2. The projection lens 9 has an optical axis substantively coinciding with the first optical axis. The laser leveling tool 1 further comprises a circuit board 7 and an optional screen 8.

The transmission type pixel panel 6 is controlled by a control unit of the circuit board 7. The transmission type pixel panel 6 comprises an array of pixel units exposed to the laser beam emitted from the laser source 2 and then shaped and expanded by the beam shaping and expansion optics. Each pixel unit has a transmission rate that is controlled by the control unit. For example, the transmission rate of the pixel unit is controlled by a voltage applied thereto.

The laser source 2, the beam shaping and expansion optics, the circuit board 7, the screen 8 and the projection lens 9 of the second embodiment are similar to that of the first embodiment and will be not described in details.

According to the second embodiment, when the laser leveling tool 1 is in operation, the control unit controls the transmission rates of the pixel units so that a laser beam conforming to a desired projection pattern is transmitted through the transmission type pixel panel 6. Then the patterned laser beam is transmitted through the projection lens 9 to be projected onto a target surface. The laser leveling tool 1 of the second embodiment has functions similar to that of the first embodiment and will be not described in details.

Figure 3:
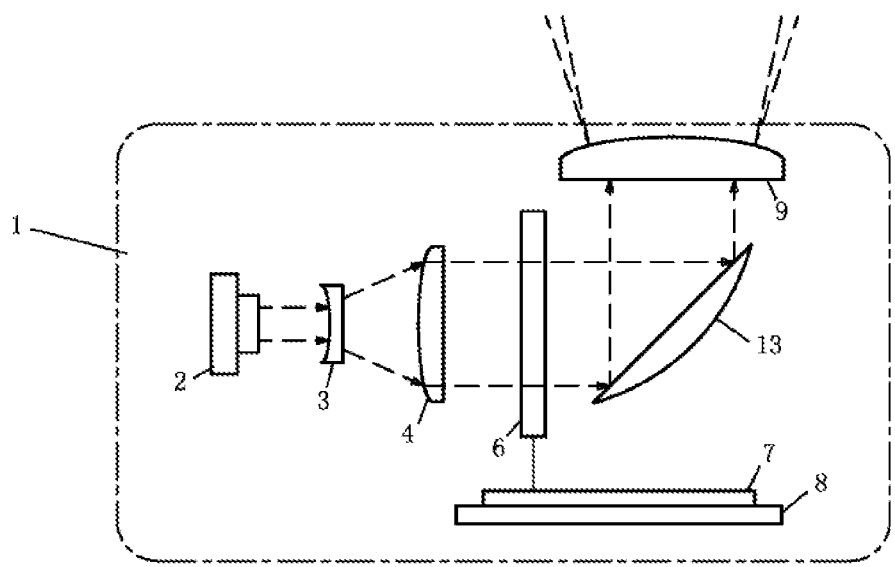
FIG. 3 is a schematic view of a variant of the laser leveling tool of FIG. 2.

FIG. 3 shows a variant of the laser leveling tool 1 of the second embodiment, which is different with the laser leveling tool 1 of the second embodiment in that a reflector 13 is disposed in the first optical axis downstream of the transmission type pixel panel 6. The reflector 13 defines a second optical axis perpendicular to the first optical axis and the projection lens 9 is disposed in the second optical axis downstream of the reflector 13. The projection lens 9 has an optical axis substantively coinciding with the second optical axis. Other aspect of this variant are similar to that of the second embodiment and will be not described in details. The variant of FIG. 3 has functions similar to that of the first and second embodiments.

According to another possible embodiment, the digital laser beam projection system of laser leveling tool 1 is a DLP (digital laser projection) type projection system which comprises a DMD (digital micromirror device) reflection panel to substitute the pixel panel 6 of the first embodiment shown in FIG. 1.

According to another possible embodiment, the digital laser beam projection system of laser leveling tool 1 is an LBS (laser beam scanning) type projection system which comprises two moving reflective mirrors in the optical path of the laser beam to substitute the pixel panel 6 of the first embodiment shown in FIG. 1. By means of the two moving reflective mirrors, projection patterns can be generated with self-focusing to achieve better light intensity.

Various other structures of the laser leveling tool 1 can be construed in accordance with the spirit of the disclosure.

Figure 4:
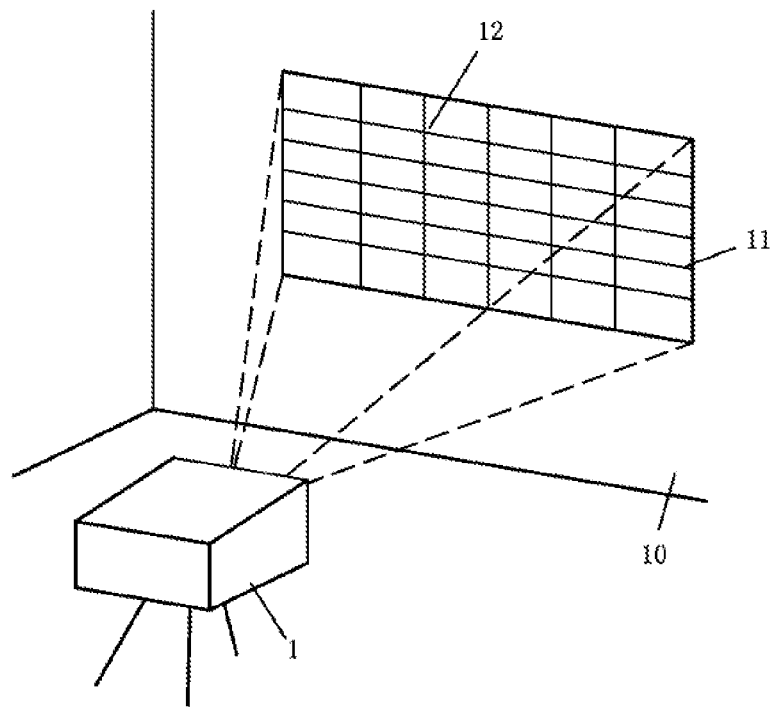
FIGS. 4 to 6 are schematic views showing some exemplary laser patterns that can be projected by the laser leveling tool of the disclosure.
Figure 5:
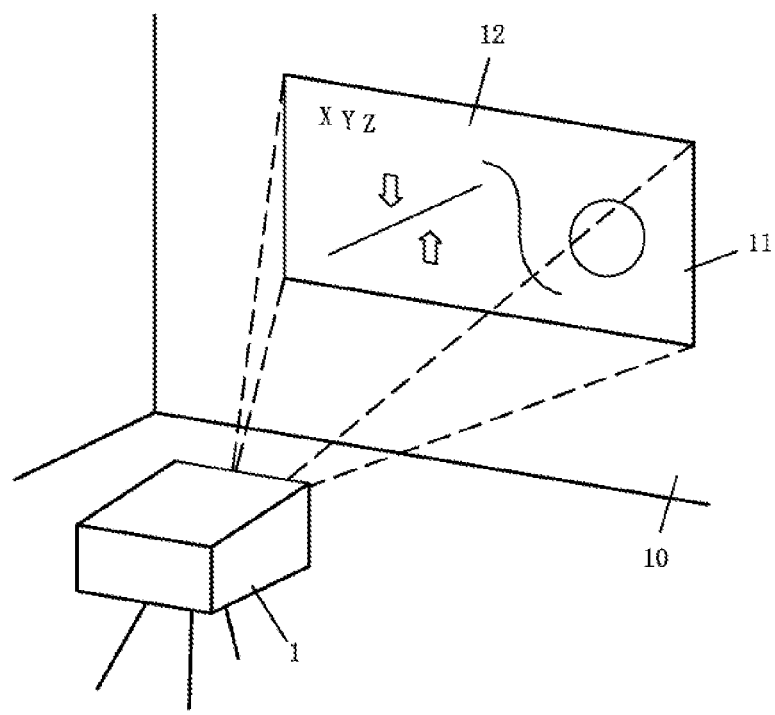

Various laser patterns, in addition to traditional ones (like dot, straight lines and cross), can be projected by the laser leveling tool 1. For example, as schematically shown in FIG. 5, oblique straight lines, curve lines, circles, arrows, characters, symbols, composite figures, etc., can be generated and projected onto a target surface 10 by the laser leveling tool 1. As another example, as schematically shown in FIG. 4, a grid of horizontal and vertical lines can be generated and projected onto a target surface 10 by the laser leveling tool 1.

Further, due to the divergence of laser, the focus depth of laser projected by the laser leveling tool 1 can be set to be very large to provide a "focus free" projection which is benefit when the target surface is not a flat plane (for example, circular surface, concaved or convex surface, corner between two walls, etc.).

Figure 6:
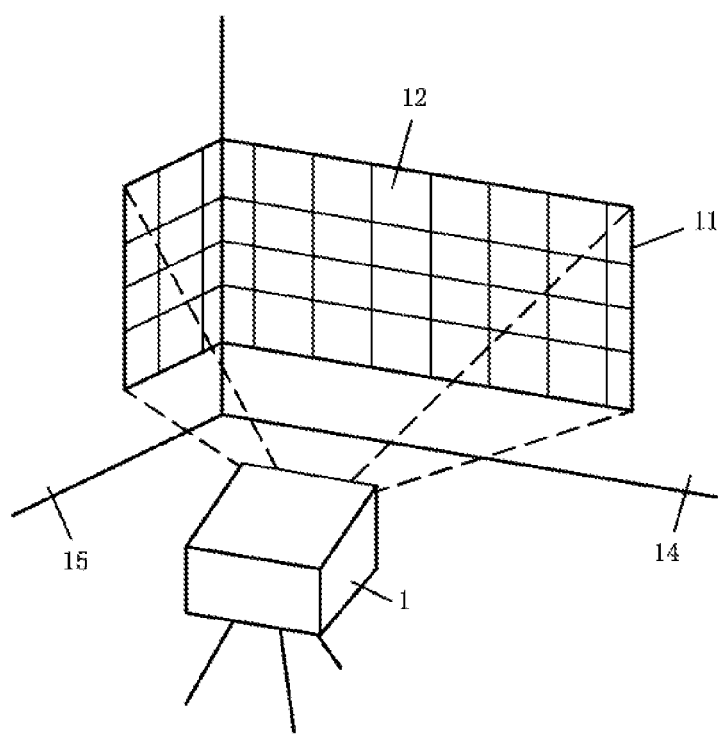

As an example, in the condition shown in FIG. 6 where the target surface is composed of two walls 14 and 15, clear patterns can be projected onto both walls by setting a "focus free" projection mode.

Further, the laser leveling tool 1 can be work with a leveling mechanism (such as an automatic or manual platform) so that the height and orientation of the laser leveling tool 1 can be adjusted.

In addition, the laser leveling tool 1 may have a self-leveling function, for example, by using a pendulum, so that the patterns projected by the laser leveling tool 1 are in a correct orientation. For example, a horizontal line projected by the laser leveling tool 1 is in a true horizontal orientation.

Alternatively, the laser leveling tool 1 may include a leveling feedback device (such as a MEMS device) so that the orientation of the laser leveling tool 1 can be detected. The control unit is able to perform orientation compensation to the projection pattern by rotating it around one or more axes automatically so that the pattern is in a correct orientation.

Further, pattern accuracy can be achieved by designing the pixel panel 6, for example, by determining pixel size and pitch.

When determining the pixel size and pitch, some factors should be considered. For example, an important factor is the size of the pixel panel 6. Another factor is pattern line width vs. projection distance (for example, the line width should not be too large even in a long projection distance). Yet another factor is brightness of the projection pattern vs. thermal issue of the pixel panel 6 (for example, the brightness should not be too large to cause very high temperature of the pixel panel 6).

It is appreciated that, in the embodiments of the disclosure, the pixel panel 6 may be integrated to the circuit board 7. The optional screen 9 may also be integrated to the circuit board 7.

It can be seen that the laser leveling tool of according to the disclosure can generate various laser patterns, thereby a user can select a laser pattern to be projected according to the real operation condition. Further, the user can perform treatment to the laser patterns before or during operation. For example, the user can input, edit and select a laser pattern before operation and change or modify the current laser pattern during operation. The laser patterns projected onto a target surface can be used as references for various construction and decoration operations, for example, cutting, wall tiling, angle and length measuring, etc. In this way, the laser leveling tool of the disclosure significantly facilitates the operations.

While certain embodiments have been described, these embodiments have been presented by way of example only, and are not intended to limit the scope of the disclosure. The disclosure are intended to cover all the modifications, substitutions and changes as would fall within the scope and spirit of the disclosure.

The invention claimed is:

1. A laser leveling tool comprising:
a laser source configured to emit a laser beam; and
a digital laser beam projection system configured to transmit the laser beam emitted from the laser source and convert the laser beam into a desired projection pattern that is to be projected onto a target surface, the digital laser beam projection system including:
a pixel panel arranged and configured to receive the laser beam emitted from the laser source; and
pixel units configured to be selectively activated to one of reflect and transmit the laser beam to form a patterned laser beam that conforms to the desired projection pattern.

2. The laser leveling tool of claim 1, wherein the digital laser beam projection system is a liquid crystal on silicon (LCOS) type projection system in which the pixel panel includes a LCOS type reflection panel.

3. The laser leveling tool of claim 1, wherein the digital laser beam projection system is a digital laser projection (DLP) type projection system in which the pixel panel includes a digital micromirror device (DMD) reflection panel.

4. The laser leveling tool of claim 1, wherein the digital laser beam projection system is a laser beam scanning (LBS) type projection system in which the pixel panel includes two moving reflective mirrors configured to generate projection patterns with self-focusing.

5. The laser leveling tool of claim 1, the digital laser beam projection system further including:
a projection lens configured to receive the patterned laser beam and project it with an enlarged scale onto the target surface.

6. The laser leveling tool of claim 1 further comprising:
a circuit board including a controller configured to control operations of the laser source and the digital laser beam projection system.

7. The laser leveling tool of claim 6, wherein the circuit board further includes a memory configured to store projection patterns.

8. The laser leveling tool of claim 6, wherein one of a reflection rate and a transmission rate of each pixel unit of the pixel units is adjustable by the controller.

9. The laser leveling tool of claim 8, wherein:
the desired projection pattern is variable by adjusting the one of the reflection rate and transmission rate of corresponding pixel units; and
wherein at least one of (i) a brightness of at least a portion whole of the desired projected pattern is set by adjusting the one of the reflection rate and transmission rate, (ii) the desired projection pattern is one of moved and rotated by adjusting the one of the reflection rate and transmission rate, (iii) at least a portion whole of the desired projected pattern is flashed by adjusting the one of the reflection rate and transmission rate, and (iv) at least a portion of the desired projected pattern is set to be different from at least one other portion of the desired projected pattern by adjusting the one of the reflection rate and transmission rate.

10. The laser leveling tool of claim 6, wherein a projection property of a projection lens of the digital laser beam projection system is adjustable by the controller, the projection lens being configured to receive the patterned laser beam and project it with an enlarged scale onto the target surface, the projection property being at least one of a projection angle, an enlargement rate, and a focus depth.

11. The laser leveling tool of claim 10, wherein the laser leveling tool has a focus free projection mode in which the focus depth of the projection lens is adjusted.

12. The laser leveling tool of claim 6, further comprising a leveling feedback device configured to detect an orientation of the laser leveling tool,
wherein the controller is configured to perform an orientation compensation of the desired projection pattern by rotating the desired projection pattern about at least one axis.

13. The laser leveling tool of claim 1 further comprising:
a user interface configured to receive inputs via which projection patterns designed by a user are inputted into the laser leveling tool, the user interface being one of (i) a physical interface on the laser leveling tool and (ii) a wireless interface which is in communication with a smart device.

14. The laser leveling tool of claim 1 further comprising:
a screen configured to display the desired projection pattern to which the patterned laser beam conforms.

15. The laser leveling tool of claim 14, wherein the screen forms a user interface.

16. The laser leveling tool of claim 1, the digital laser beam projection system further including:
beam shaping and expansion optics disposed between the laser source and the pixel panel.

17. The laser leveling tool of claim 16, wherein:
the pixel panel is a reflection type liquid crystal panel facing a direction substantially perpendicular to an optical axis of the laser source; and
the digital laser beam projection system further includes a beam splitter disposed in the optical axis of the laser source at a location faced by the pixel panel.

18. The laser leveling tool of claim 16, wherein the pixel panel is a transmission type liquid crystal panel disposed in an optical axis of the laser source facing a direction substantially parallel to the optical axis of the laser source.

19. The laser leveling tool of claim 1 further comprising:
a self-leveling mechanism configured to set the laser leveling tool in a self-leveled orientation.

20. The laser leveling tool of claim 1, wherein a size and a pitch of the pixel units are determined to achieve a desired pattern accuracy.

* * * * *